United States Patent [19]

Meier et al.

[11] Patent Number: 5,781,778
[45] Date of Patent: Jul. 14, 1998

[54] METHOD AND SYSTEM FOR DEBUGGING PARALLEL AND DISTRIBUTED APPLICATIONS

[75] Inventors: Michael S. Meier, Newark; Hsin Pan, San Jose, both of Calif.

[73] Assignee: International Business Machines Corporation, Armonk, N.Y.

[21] Appl. No.: 869,661

[22] Filed: Jun. 5, 1997

Related U.S. Application Data

[60] Continuation of Ser. No. 483,215, Jun. 7, 1995, abandoned, which is a division of Ser. No. 314,839, Sep. 29, 1994, abandoned.

[51] Int. Cl.[6] .................................................. G06F 11/00
[52] U.S. Cl. .................. 395/704; 395/183.21; 395/670; 395/680; 395/200.08; 395/200.46; 364/975.5
[58] Field of Search ..................... 395/704, 183.21, 395/670, 680, 200.08, 200.46; 364/975.5

[56] References Cited

U.S. PATENT DOCUMENTS

| | | | |
|---|---|---|---|
| 5,127,103 | 6/1992 | Hill et al. ............................... | 395/575 |
| 5,319,645 | 6/1994 | Bassi et al. ............................ | 371/19 |
| 5,404,523 | 4/1995 | DellaFara et al. ..................... | 395/650 |
| 5,410,648 | 4/1995 | Pazel .................................... | 395/158 |

OTHER PUBLICATIONS

Shimomura et al. *Chase: A Bug–Locating Assistant System*, IEEE Computer Software and Applications Conference 1991 COMPAC, pp. 412–417.

*Primary Examiner*—Emanuel Todd Voeltz
*Assistant Examiner*—Michael T. Richey
*Attorney, Agent, or Firm*—Prentiss W. Johnson

[57] ABSTRACT

A debugger client/server application comprising a front-end and one or more back-ends, including a Director component which handles most of the initialization and parallel execution control issues and a rp_client component and rp_server component which handles most of the distributed execution issues. The Director allows a Debug Engine to be unaware of most of the parallel and distributed aspects of the application. Thus, the Debug Engine can be created by re-using a serial debugger for presenting the state information about the various programs that make up the application.

5 Claims, 3 Drawing Sheets

METHOD AND SYSTEM FOR DEBUGGING PARALLEL AND DISTRIBUTED APPLICATIONS

This application is a continuation of application Ser. No. 08/483,215, filed Jun. 7, 1995, now abandoned, which is a divisional of application Ser. No. 08/314,839 filed on Sep. 29, 1994, now abandoned.

CROSS-REFERENCE TO RELATED APPLICATIONS

Application Ser. No. 08/314,838, filed concurrently herewith on Sep. 29, 1994 for METHOD OF WALKING-UP A CALL STACK FOR A CLIENT/SERVER PROGRAM THAT USES REMOTE PROCEDURE CALL (IBM Docket ST9-94-027), currently co-pending, and assigned to the same assignee as the present invention.

The foregoing copending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to methods and systems in the field of software programming development, and more particularly to methods and systems used to debug software programs.

2. Description of the Related Art

The prior art for parallel and distributed debuggers is illustrated by serial debuggers and parallel and distributed debuggers. Serial debuggers are incapable of effectively debugging parallel and distributed applications (e.g., client/ server, peer-to-peer, etc.). Parallel and distributed debuggers generally have required a complete instantiation of the debugger for every program that makes up the distributed application on each machine where the distributed application is running, thus yielding multiple debuggers and multiple user interfaces.

In view of the above, there is a need for a method of, and system for, debugging parallel and distributed applications having multiple programs with many threads of execution running on various machines on a variety of operating systems, from a single user interface.

SUMMARY OF THE INVENTION

One of the major inhibitors to developing parallel and distributed applications (e.g. client/server, peer-to-peer) is the lack of good debugging tools. To debug a parallel and distributed application the tool should provide dbx-like functions that will allow the user to monitor and control the execution of multiple programs with many threads of execution running on various machines. It must also allow the user to display and modify the run-time state of all of those programs in a coherent fashion from a single user interface. The present invention provides such a method for debugging parallel and distributed applications. This invention can be applied to debugging applications running on variety of operating systems including UNIX, OS/2, Windows, and MVS.

BRIEF DESCRIPTION OF THE DRAWINGS

For a more complete understanding of the present invention and the advantages thereof, reference is now made to the Detailed Description in conjunction with the attached Drawings, in which:

FIG. 5 is pictorial block diagram representation of a debugger component architecture for multiple client/server programs in accordance with the present invention.

DESCRIPTION OF THE PREFERRED EMBODIMENT

Figure 1:
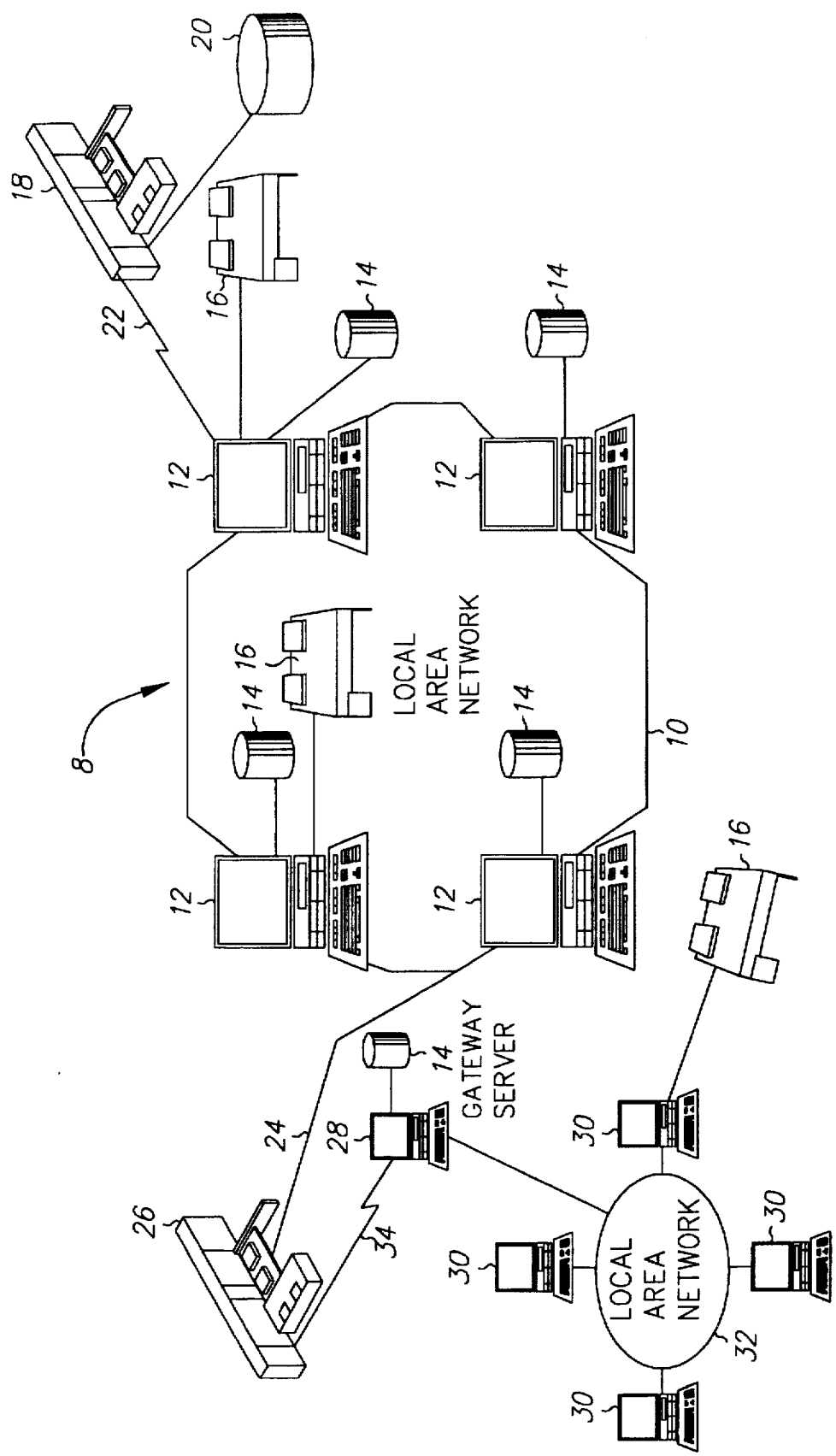
FIG. 1 a pictorial representation of a distributed data processing system which may be used to implement the method of the present invention.

With reference now to the figures and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various computer programs which may be accessed, executed, and debugged by a user within data processing system 8, in accordance with the method of the present invention. In a manner well known in the prior art, each such computer program may be stored within a storage device 14.

Still referring to FIG. 1, it may be seen that data processing system 8 may also include multiple mainframe computers, such as mainframe computer 18, which may be preferably coupled to Local Area Network 10 by means of communication link 22. Mainframe computer 18 may also be coupled to a storage device 20 which may serve as remote storage for Local Area Network 10 which may be coupled via communications controller 26 and communications link 34 to a gateway server 28. Gateway server 28 is preferably an individual computer or Intelligent Work Station which serves to link Local Area Network 32 to Local Area Network 10.

As discussed above with respect to Local Area Network 32 and Local Area Network 10, a plurality of server computer programs may be stored within storage device 20 and executed by mainframe computer 18. Similarly, a plurality of client computer programs may be stored within storage devices 14 and executed by individual computers 12 such that distributed client/server computer programs are provided. Of course, those skilled in the art will appreciate that the mainframe computer 18 may be located a great geographical distance from Local Area Network 10, and similarly, Local Area Network 10 may be located a substantial distance from Local Area Network 32. That is, Local Area Network 32 may be located in California while Local Area Network 10 may be located within Texas and mainframe computer 18 may be located in New York.

As will be appreciated upon reference to the foregoing, it is often desirable for a user within one portion of distributed data processing system 8 to execute computer programs on one or more portions of data processing system 8. For example, the user may execute an client computer program on computer 12 which requests services from a server program executing on mainframe 18 which further requests services from service routines executing on computer 30. To verify the proper operation of such a distributed set of client/server programs, the user may wish to debug the distributed set of client/server programs as if they were one single program. Therefore, it should be obvious that a need exists for a method whereby the user may debug the distributed set of client/server programs as if they were one single program.

Figure 2:
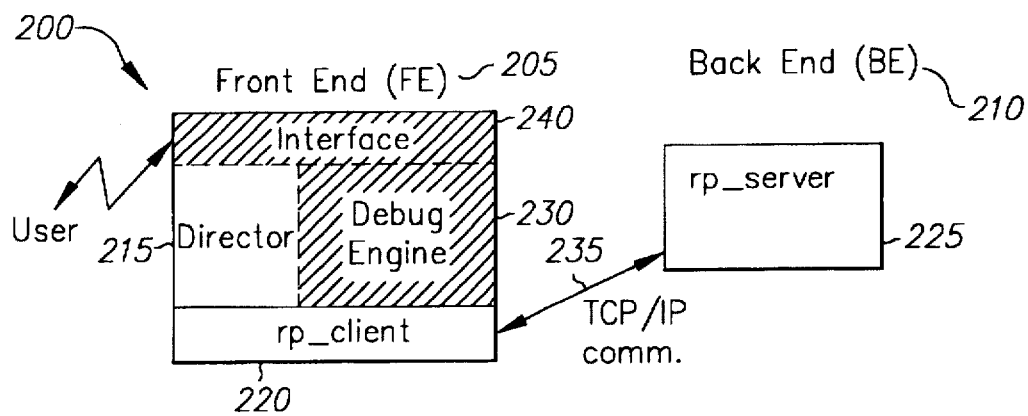
FIG. 2 is pictorial block diagram representation of a debugger component architecture in accordance with the present invention.
Figure 3:
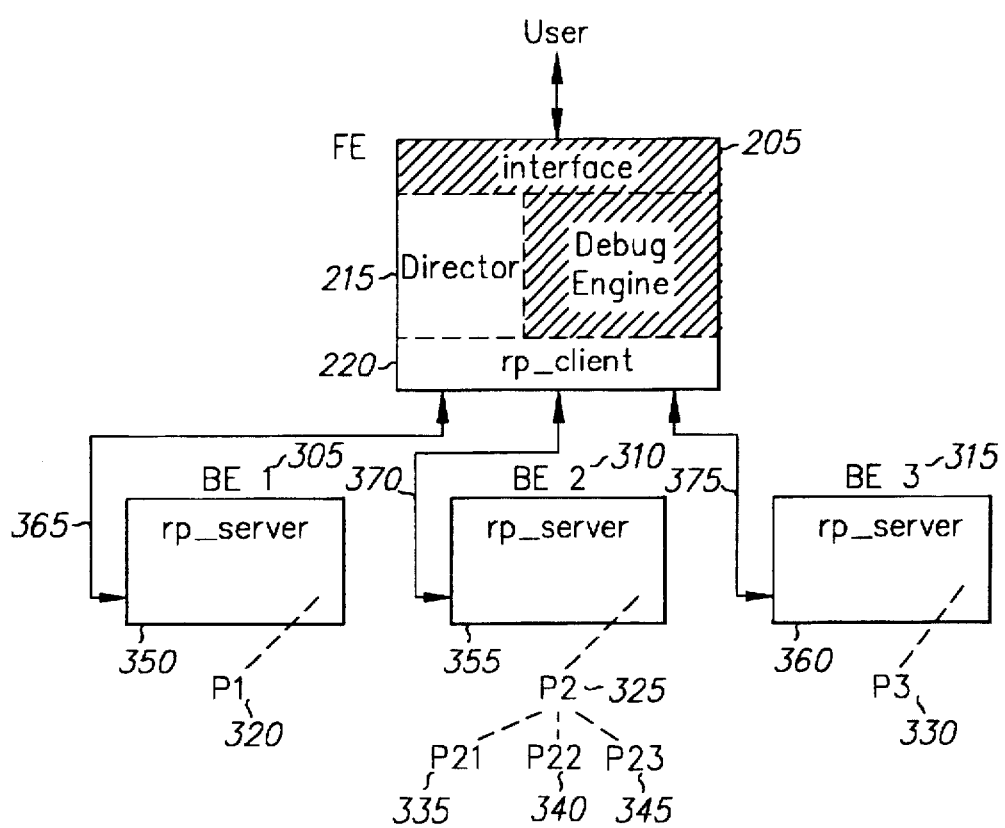

Referring now to FIG. 2, the preferred embodiment of the present invention is a debugger 200 which is itself a client/server application. It consists of a front-end 205 and one or more back-ends 210 as illustrated in FIG. 2 and FIG. 3.

This invention creates a Director 215 component which handles most of the initialization and parallel execution control issues and a rp_client 220 and rp_server 225 component which handles most of the distributed execution issues.

The Director 215 allows the Debug Engine 230 to be unaware of most of the parallel and distributed aspects of the application. Thus, the Debug Engine can be created by re-using a serial debugger for presenting the state information about the various programs that make up the application.

Back-End

Referring now to FIG. 3, a back-end (305, 310, and 315) is allocated for each program (320, 325, and 330) (i.e. client or server program) involved in the application. The creation of back-ends (305, 310, and 315) is done by the front-end Director component 215 when the debugger 200 is invoked. Each application program (320, 325, and 330) is monitored by its corresponding back-end (305, 310, and 315) during the debugging process. The back-end (305, 310, and 315) will execute requests from the front-end 205 to control the execution of the application program (320, 325, and 330) and read/write state information.

For the single client/server paradigm, which is a very common case, if the client or server program is on the same machine as the debugger front-end, then the program is directly monitored by the front-end (rp_client component) to avoid the overhead of allocating a back-end. This optimization is especially effective for debugging a non-distributed program that will eliminate the need to allocate a back-end.

In some operating systems, an address-space can create additional address-spaces. For example, a program running in a UNIX process (i.e. address-space) such as P2 325 can create additional processes (such as P21 335, P22 340, and P23 345) during execution by executing fork system call, and then load a new program into that process using the exec system call. The process for the application program 325 and all processes that it has created (335, 340, and 345) can be monitored by a single back-end 310. In addition, the backend handles interrupt signals from those processes and passes information to the front-end as needed.

The rp_server component (350, 355, and 360) in the back-end (305, 310, and 315 respectively) is responsible for the communication with the rp_client component 220 in the front-end. The message requests that flow from the the front-end to the back-end are:

Establish Connection
Establishes the connection between the front-end and the back-end.

Load A Program
Load a program and begin monitoring it.

Get Loader Information
Read information about a program that is currently loaded and being monitored by the back-end.

Read Program State
A request to read the value from a register or location in memory of a program being monitored by the back-end.

Write Program State
A request to write a value to a register or location in memory of a program being monitored by the back-end.

Start Execution
Start the execution of all the programs that are monitored by the back-end.

Wait For Interrupt
Determine if a interrupt (e.g. breakpoint) has occurred in any thread.

Stop Execution
Stop the execution of the programs that are monitored by the back-end.

Read Thread Information
Read information about a particular thread. The information sent back to the front-end includes the thread state (e.g. running, ready, waiting) and status (e.g. breakpoint, interrupted, floating point exception), current instruction pointer, and current frame pointer. This routine can be called iteratively to obtain information about all of the threads running in an address-space.

Unload A Program
Unload a program and stop monitoring it.

Quit
Terminate the back-end and disconnects it from the front-end.

The communication between the front-end and the back-end (235, 365, 370, and 375) can be implemented using any of a variety of standard protocols including TCP/IP, SNA, NETBIOS. The general model of the communication is Remote Procedure Call (RPC).

FIG. 3 illustrates an example of a multiple client/server UNIX application. Programs P1 320 and P3 330 each have one process only, but P2 325 spawns three processes (P21 335, P22 340, and P23 345) during execution. The communication functions of every back-end talks to the same component of the front-end, rp_client using Sun RPC running on a TCP/IP communications protocol.

Front-End

Referring back to FIG. 2, the debugger front-end 205 is composed of the Director 215, Debug Engine 230, Interface 240, and rp_client 220 components. The shadow area in FIG. 2 (i.e., Interface 240 and Debug Engine 230) are both re-used from a serial debugger with some modifications.

Note that it is very common for a serial debugger to be divided into an Interface component and a Debug Engine component. For example, dbx for AIX/6000 supplies a programming interface between its command line processor and debug engine. This allows other debugger front-ends (e.g. xde or the workbench debugger) to re-use the dbx Debug Engine.

Director

The Director 215 allows the Debug Engine 230 and Interface 240 components to be unaware of most of the parallel and distributed aspects. A serial debugger will generally have a set of global variables that are used to record the state of the debugging session. For example, which breakpoints or watchpoints have been set, the location of the symbol table information, the name of the program that is currently loaded etc. In the present invention, the serial debugger's global variables will become fields of new data structures that are allocated by the Director component.

Figure 4:
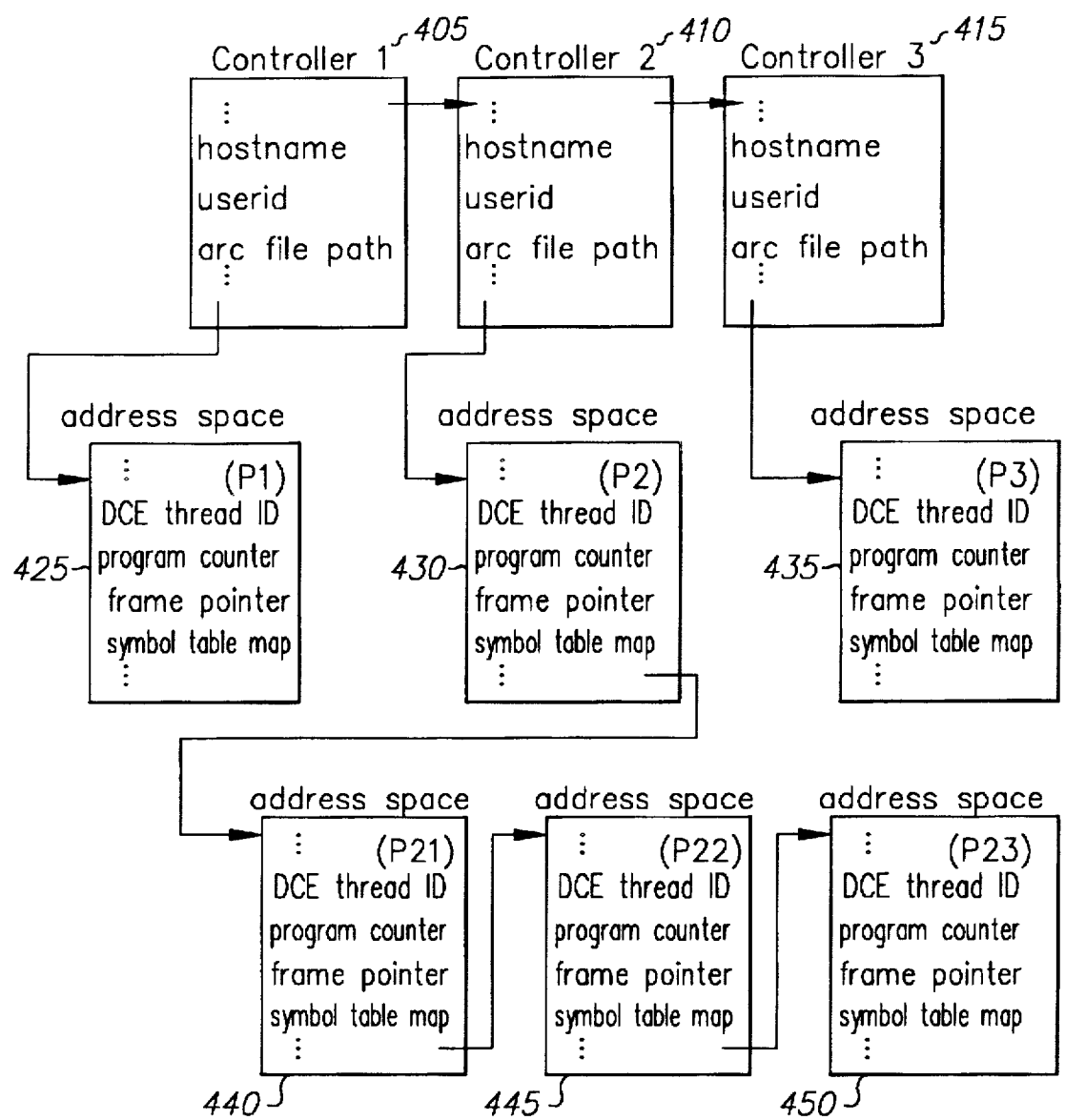
FIG. 4 is pictorial block diagram representation of controller and address-space data structures of a debugger front-end in accordance with the present invention.

Referring now to FIG. 4, for each back-end (305, 310, and 315) created during initialization, the Director 215 allocates a data structure called a controller (405, 410, and 415 respectively). The controller is used to record information such as the absolute path where the source code can be found, the hostname of the machine where the application program is executing, the name of the original program that was loaded etc..

The controller also points to a set of address-space data structures (425, 430, 435, 440, 445, and 450) that keep track of the current execution state for each program (e.g. UNIX process) that is being monitored by the back-end. The execution state includes the name of the program that is currently being executed, the ID of the current thread, the current program counter, a pointer to the current stack frame, and information about the most recent program interrupt. The address-space data structure also contains information such as: the setting of breakpoints and watchpoints, the location of the symbol table information, and the format of variables when they are displayed to the interface.

As an example, when the user requests the Interface component 240 to display a particular thread of an application 320, the Director 215 instructs the rp_client component 220 to send all future communications to the back-end 305 that is monitoring the selected thread 320. The Director 215 then makes assignments to a set of variables that point to the controller 405 and address-space data structures 425 which correspond to the specific machine, address-space, and thread that was selected.

A set of macros are defined to allow the routines in the Debug Engine 230 and Interface 240 components to access and update the serial debugger's global variables by de-referencing the fields in the selected controller and address-space data structures. Also, additional macros are written so that calls to read and write the program state will be handled by routines in the rp_client 220 and rp_server 225 components.

Therefore, the Debug Engine 230 and Interface 240 components can be coded as if they are debugging a single program. This technique minimizes the changes to the original source code from the serial debugger.

In response to a start execution command from the user, the Director 215 will supervise the execution of the parallel and distributed application. It starts the application by sending commands to each back-end (305, 310, and 315) to start or continue executing the programs (320, 325, and 330 respectively) they are monitoring. The Director 215 will then poll the back-ends (305, 310, and 315) for current status until one of the back-ends reports that a program it is monitoring has encountered a breakpoint, watchpoint, program interrupt, or termination. At that moment, the Director 215 will send a stop command to all other back-ends which in turn send an interrupt program execution signal (e.g., SIGINT in UNIX) to each of the programs they are monitoring. Meanwhile, the Director 215 tells the Interface 240 and Debug Engine 230 components which thread caused the application to stop. The Interface 240 is then called to allow the user to display and modify the frozen state of that thread. As a result, the Interface 240 will call the Debug Engine 230 to read and write the thread state.

Debug Engine

The Debug Engine component 230 is derived from an existing serial debugger which supports conventional serial debugging commands (e.g., symbol table resolution, setting breakpoints, step execution, etc.). It uses the set of macros mentioned above to allow the routines in the Debug Engine 230 to access and update the controller (405, 410, and 415) and address-space data structures (425, 430, and 435 respectively) that record the state of the debugging session and to read and write the program state. This component can be coded as if it is debugging a non-distributed serial program.

Interface

The Interface component 240 is also derived from the serial debugger. It uses the same set of macros defined above to access and update the controller (405, 410, and 415) and address-space data structures (425, 430, and 435 respectively) and to read and write the program state. This again minimizes changes to the original source code from the serial debugger.

This component needs to be modified so that it commands to start and stop the execution of the parallel and distributed application are sent to the Director component 215 rather than directly to the Debug Engine 230.

In addition, modifications are needed to list and select the various machines, address-spaces, and threads of the parallel and distributed application.

For example, if the debugger 200 has a window based interface 240 a new window could be added to list all of the machines, address-spaces, and threads involved in the application in an indented list:

machine1
  address-space1
    thread1
    thread2
    thread3
  address-space2
    thread1
    thread2
machine2
  address-space1
    thread1
    thread2
    thread3
  address-space2
    thread1
    thread2
    thread3

When the application is stopped the user can select any of the threads in that window by clicking on it. A call is made to a routine in the Director component 215 to set the current machine, address-space, and thread. Routines in the Interface component 240 are then called to re-draw the state of the selected machine, address-space, and thread.

In the case of a command driven non-window interface, two new commands need to be added: one to list the various machines, address-spaces, and threads; and a second one to set the current machine, address-space, and thread.

rp_client

The rp_client component 220 contains an Application Programming Interface (API) for a set of routines that are used to communicate with the various back-ends (305, 310, and 315). There is one routine for every type of message request that flows between the front-end 205 and back-end (305, 310, and 315). Also, there is a routine which is called by the Director 215 to specify which back-end to communicate with. The rp_client 220 marshalls the argument passed by the API call into a message and sends it to the back-end (305, 310, and 315) using a synchronous protocol (e.g. RPC) (235, 365, 370, and 375). Eventually, the rp_client 220 component will receive a response message from the back-end (305, 310, and 315) which contains return arguments. These arguments are unmarshalled from the message and passed back to the caller of the API routine. The rp_client component 220 communicates with only one back-end at a time that is specified by the Director 215.

Control Flows of Director Initialization

The Director component 215 is invoked during the initialization of the debugger 200 to start the application running under the debugger 200. The application may be made up of multiple programs with many threads of execution running on various machines. The user needs to specify the various programs that make up the application. For each program the user needs to specify the program arguments, the host machine the program should run on, and the user ID the program should run under. In addition, the role the program plays with respect to client/server and peer-to-peer communication may be specified. The valid roles are client, server, both, peer-to-peer, or none. The Director component 215, for example, may use the role information to determine the order in which the programs need to be started (e.g., servers must start before clients). Optionally, additional information may be specified for passwords, debugging options, etc.. For example, the debugger 200 may allow the user to specify this information in a file such as in the following example:

| -H davinci | -U hpan | -P secrets | -R client | calc_client 264167 |
| -H davinci | -U hpan | -P secrets | -R client | calc_client 545555 |
| -H atlantic | -U meier | -P dontlook | -R server | calc_servera |
| -H thistle | -U hpan | -P hideit | -R both | calc_serverb |

This example file shows a distributed application made up of four programs running on three different machines under three different user ID's. The first line specifies a program named calc_client should be started on a machine named davinci under the user ID of hpan with password secrets. The program will play the role of a client and is passed one argument which is 264167. The second line starts a second instance of the client program calc_client on the same machine and user ID. In this case, the program argument is 545555. The third line specifies that a program named calc_servera should be started on a machine named atlantic under the user ID of meier with password dontlook. This program will play the role of a server. And finally, the fourth line specifies that a program named calc_serverb should be started on a machine named thistle under the user ID of hpan with password hideit. This program is both a client program and a server program.

The following procedure is executed once for each of the programs that make up the application. During initialization, the debugger 200 will call the Director component 215 passing the name of the file that specifies the various programs for the application. The director component 215 will open the above file and for each program specified will do the following:

1. Read in the name of the program, arguments, host machine etc..
2. Allocate and initialize a controller data structure.
3. Start a debugger back-end on the host machine that the program should run on using the remote execution command (rexec).
4. Allocate and initialize an address-space data structure.
5. Send a Establish Connection message request to the debugger back-end.
6. Send a Load A Program message request to the back-end to load the application program.
7. Send a Get Loader Information message request to the back-end to update the address-space data structure with information about what programs and library routines were loaded as a result of the Load A Program message request.
8. Send a Get Symbol Table message request to the back-end to update the address-space data structure with the symbol tables for the programs and library routines.
9. Call the Debug Engine to perform standard initialization routines (e.g., run the program to the first executable source line).

Running the Application Program

In response to one of the start execution commands from the user, the Interface component 240 will call the Director component 215 to supervise the execution of the parallel and distributed application. The Director component 215 starts the application by sending commands to each back-end (305, 310, and 315) to start or continue executing the programs they are monitoring.

In many client/server applications, it is necessary for the server programs to be running before the clients can be started. By specifying the roles of client, server, or both for the programs, the Director 215 may ensure that the client programs are not started until all of the programs that are servers or both are ready to receive client requests. In the general case, the user can add a call to a library routine named dbgServerReady at the point in the server program where it is ready to receive client messages. The C language syntax for this library routine is: dbgServerReady();.

This dbgServerReady routine notifies the Director component 215 of the debugger 200 that the server is ready to receive client requests by, for example, sending a signal or executing a breakpoint. If the server is not running under the debugger 200, dbgServerReady will simply return. To improve ease of use, the communication middle-ware may automatically execute the call to dbgServerReady. For example, for RPC it may be executed at the beginning of the RPC "server listen" routine.

After the application is started, the Director 215 will poll the back-ends (305, 310, and 315) for current status until one of the back-ends reports that a program it is monitoring has encountered a breakpoint, watchpoint, program interrupt, or termination. The Director 215 will then send a Stop Execution message request to all other back-ends, which in turn will send an "interrupt program execution" signal (e.g., SIGINT in UNIX) to each of the programs they are monitoring.

The following are the steps preferred in carrying out the method of, and system for, the Director 215 when it is called by the Interface component 240 in response to a command from the user to start or continue the execution of a distributed application. These steps are sufficient to enable one of ordinary skill to write code in any suitable computer programming language.

1. Start or continue the execution of the application by looping thru all of the controllers and, for each one, doing the following:

a. If the role of the program associated with the controller is client, check to see that all of the programs that have a role of server or both have executed the dbgServer- Ready library routine and are therefore ready to receive client requests. If not skip to the next controller.

b. For all address-space structures pointed to by this controller execute the conventional debugger routine that will start the program executing.

2. Execute polling loop.

a. Get the first controller from the list of controllers created at debugger initializtion.

b. Send a Check For Interrupt message request to the back-end. If an interrupt has occurred, exit the polling loop by going to step 3.

c. If not at the end of the list of controllers, get the next controller and go to step 2.b.

d. Call a user interface routine to determine if the user has executed a Stop command. If yes, exit the polling loop by going to step 3.

e. Wait for one second to limit the contention of network resources (e.g. execute a sleep(1) UNIX system call).

f. Go back to the beginning of the polling loop at step 2.a.

3. Stop the execution of the application by looping thru all of the controllers and sending a Stop Execution message request to any controller that has at least one thread still running.

4. Update the controller and address-space data structures by looping thru all of the controllers again and, for each one, doing the following:

a. Get the first address-space ID running under the back-end by sending a Get Next Address Space ID message request with a address-space ID of 0.

b. If no more address-space IDs are found, continue to next controller.

c. Search the list of address-space data structures pointed to by the controller data structure to determine if this is a new address space (e.g., created by fork system call on UNIX). If this is a new address-space:

Allocate and initialize an address-space data structure.

Send a Get Loader Information message request to the back-end to update the address-space data structure with information about what programs and library routines were loaded.

Send a Get Symbol Table message request to the back-end to update the new address-space data structure with the symbol tables for the programs and library routines.

d. Send a Get Address Space Information message request to the back-end and update the address-space data structure.

e. Send a Get Thread Information message request to the back-end for the current thread ID and update the address-space data structure.

f. If the information about that last program interrupt in the address-space indicates that a dynamic load has occured do the following:

Send a Get Loader Information message request to the back-end to update the address-space data structure with information about what programs and library routines were loaded.

Send a Get Symbol Table message request to the back-end to update the new address-space data structure with the symbol tables for the programs and library routines.

g. If the information about that last program interrupt in the address-space indicates the program has executed a call to the dbgServerReady library routine, set a flag in the address-space data structure to indicate that this server is ready to receive client requests.

h. Check to see if there are any more address-spaces running under the back-end by sending a Get Next Address Space ID message request and go to step 4.b.

5. After all the controller and address-space data structures have been updated, return to the User Interface component which will display the current state of the application to the user and process commands.

Using the foregoing specifications, the invention may be implemented using standard programming techniques. The resulting programs may be stored on disk, diskettes, memory cards, ROM or any other memory device for use in a computer. For execution, the program may be copied into the RAM of the computer. One skilled in the art of computer science will easily be able to combine the software created as described with appropriate general purpose or special purpose computer hardware to create a system for executing the programs. While the preferred embodiment of the present invention has been illustrated in detail, it should be apparent that modifications and adaptations to that embodiment may occur to one skilled in the art without departing from the scope of the present invention as set forth in the following claims.

We claim:

1. An article of manufacture for use in a computer system for debugging a distributed computer program comprising a plurality of processes, by a distributed debugger comprising a front end and a back end, said article of manufacture comprising a computer-readable storage medium having a computer program embodied in said medium which causes the computer system to:

allocate an address-space data structure associated with each of the plurality of processes monitored by the back end, the address-space data structure storing a run-time state of the associated process wherein the run-time state comprises a value from a register or location in memory of the associated process;

allocate by the front end a controller data structure for each back end, the controller data structure pointing to the address-space data structure associated with the process monitored by the back end;

request by the front end the run-time state of the monitored process from the back end monitoring the monitored process;

store the run-time state of the monitored process in the address-space data structure; and access the address-space data structure via the controller data structure by a debug engine to display the run-time state.

2. The article of manufacture of claim 1 wherein said computer program further causes the computer system to:

access the controller data structure by a debug engine to modify the run-time state; and request by the front end the modification be performed by the back end on the monitored process.

3. The article of manufacture of claim 1 wherein said computer program further causes the computer system to store identifying information for the monitored process in the controller data structure.

4. The article of manufacture of claim 1 wherein said computer program further causes the computer system to cause the front end to poll the back end to determine a current status of the monitored process.

5. The article of manufacture of claim 1 wherein said computer program further causes the computer system to cause the front end to send a stop execution message request to another one of the plurality of processes.

* * * * *